United States Patent [19]

Saitow

[11] Patent Number: 4,749,142
[45] Date of Patent: Jun. 7, 1988

[54] WEBBING RETRACTOR

[75] Inventor: Tosio Saitow, Aichi, Japan

[73] Assignee: Kabushiki Kaisha Tokai-Rika-Denki-Seisakusho

[21] Appl. No.: 946,207

[22] Filed: Dec. 24, 1986

[30] Foreign Application Priority Data

Dec. 27, 1985 [JP] Japan .................................. 60-294727
Dec. 27, 1985 [JP] Japan .................................. 60-294728

[51] Int. Cl.⁴ ...................... B65H 75/48; A62B 35/02
[52] U.S. Cl. ...................... 242/107.4 R; 242/107.4 A; 242/107.4 B
[58] Field of Search .................. 242/107.4 R, 107.4 A, 242/107.4 B; 280/806; 297/478

[56] References Cited

U.S. PATENT DOCUMENTS

| | | |
|---|---|---|
| 3,348,789 | 10/1967 | Hirsch . |
| 3,648,946 | 3/1972 | Stoffel . |
| 3,741,495 | 6/1973 | Takada . |
| 4,023,746 | 5/1977 | Magyar ............................ 242/107.7 |
| 4,212,435 | 7/1980 | Kawaharazaki ......... 242/107.4 R X |
| 4,391,418 | 7/1983 | Puryear ......................... 242/84.2 A |
| 4,436,255 | 3/1984 | Matsui ......................... 242/107.4 A |
| 4,509,706 | 4/1985 | Thomas ........................ 242/107.4 A |
| 4,518,132 | 5/1985 | Schmidt ....................... 242/107.4 A |
| 4,566,649 | 1/1986 | Peterson ...................... 242/107.4 A |
| 4,570,873 | 2/1986 | Kurtti .......................... 242/107.4 A |
| 4,597,543 | 7/1986 | Mori ............................ 242/107.4 B |
| 4,597,546 | 7/1986 | Yamamoto ................... 242/107.4 A |
| 4,687,156 | 8/1987 | Mori ........................ 242/107.4 B X |

FOREIGN PATENT DOCUMENTS 2745591 8/1978 Fed. Rep. of Germany .
120835 8/1984 Japan .

Primary Examiner—Stuart S. Levy
Assistant Examiner—Katherine Matecki
Attorney, Agent, or Firm—Sixbey, Friedman & Leedom

[57] ABSTRACT

A webbing retractor for use in a seatbelt system for a vehicle designed to protect an occupant when an emergency situation of the vehicle occurs. When the occupant has a webbing fastened after it has been substantially fully rewound, if an acceleration sensor senses a predetermined level of acceleration acting on the vehicle, the sensor engages with a lock wheel to lock a webbing take-up shaft from rotating in a direction in which the webbing is unwound. When the webbing is substantially fully unwound from the take-up shaft, an engagement lever opposes the lock wheel. In this state, the webbing is allowed to be rewound, but when it is unwound, the engagement lever, which receives the rotational force from the take-up shaft through friction, is engaged with the lock wheel, thus causing the rotation of the lock wheel to be delayed with respect to the rotation of the take-up shaft. Sensing this delayed rotation, a lock means locks the take-up shaft from rotating in the webbing unwinding direction. When the webbing is rewound, the engagement lever is separated from the lock wheel. Accordingly, the lock wheel rotates without any contact between the engagement lever and the tips of ratchet teeth formed on the lock wheel, and therefore no chattering noise is generated.

21 Claims, 6 Drawing Sheets

WEBBING RETRACTOR

BACKGROUND OF THE INVENTION

1. Field of the Invention

The present invention relates to a webbing retractor for winding up an occupant restraining webbing and, more particularly, to a webbing retractor for use in a seatbelt system for a vehicle which is so designed that it can selectively be set in two states, that is, one wherein, after an occupant restraining webbing has been fastened to the occupant's body, it is prevented from being unwound at all times, and the other wherein a webbing take-up shaft is locked from rotating in the direction in which the webbing is unwound only when an emergency situation of the vehicle occurs.

2. Description of the Related Art

A typical conventional webbing retractor which is installed on a vehicle incorporates a lock mechanism adapted to lock, when necessary, a webbing take-up shaft from rotating in the direction in which an occupant restraining webbing is unwound.

There are two types of lock mechanism: one which is known as "ELR" (Emergency Locking Retractor) wherein, when the vehicle is in a normal state, the webbing is allowed to be unwound and rewound as desired, whereas, when the vehicle runs into an emergency situation, this is sensed by an acceleration sensor and the take-up shaft is instantaneously locked from rotating in the direction in which the webbing is unwound; and the other which is known as "ALR" (Automatic Locking Retractor) wherein, after the webbing has been fastened to the occupant's body, the take-up shaft is locked from rotating in the direction in which the webbing is unwound.

In the ELR, when the vehicle is running in a normal state, the occupant who has the webbing fastened can freely wind the webbing in and out on the take-up shaft so as to assume a desired driving posture.

In the ALR, on the other hand, after a predetermined amount of webbing has been unwound, it is prevented from being unwound from the take-up shaft, which means that the occupant's body can reliably be restrained by the webbing.

One type of webbing retractor which is provided with both ELR and ALR systems has already been disclosed (see, for example, the specification of Japanese Utility Model Laid-Open No. 76252/1984).

This type of conventional retractor is so designed that the ELR and ALR modes can be switched over from one to the other according to need. More specifically, when the webbing is fully rewound on the take-up shaft, a pawl which is engageable with a lock wheel by means of a biasing force is forced to disengage from the lock wheel and prevented from reengaging with it, thereby bringing the retractor under the control of lock means activated by the acceleration sensor. When the webbing, after it has fully been unwound, is rewound, the pawl is enabled to engage with the lock wheel, so that it is possible to prevent the webbing from being unwound thereafter.

Accordingly, a single webbing retractor can selectively serve as ELR and ALR according to need.

The above-described conventional webbing retractor suffers, however, from the following problems.

Since the structure for effecting switching over between ELR and ALR is complicated and requires a relatively large number of parts, the assembling operation is complicated and troublesome, disadvantageously.

Further, when ALR is to be switched over to ELR, the webbing must be fully rewound, and during this rewinding operation, the lock wheel rotates together with the take-up shaft while being in contact with the pawl, resulting in generation of chattering noise.

SUMMARY OF THE INVENTION

In view of the above-described circumstances, it is a primary object of the present invention to provide a webbing retractor which has a simplified structure and is free from generation of chattering noise when the webbing is rewound in the ALR mode.

To this end, the present invention provides a webbing retractor for use in a seatbelt system for a vehicle designed to protect an occupant when an emergency situation of the vehicle occurs, the webbing retractor being able to be selectively set in two states, that is, one wherein an occupant restraining webbing is stopped from being unwound in accordance with the level of acceleration which acts on the vehicle, and the other wherein the webbing is allowed to be rewound only, comprising: a webbing take-up shaft; a lock wheel rotated in unison with the rotation of the take-up shaft in a direction in which the webbing is unwound; an acceleration sensor for sensing an acceleration acting on the vehicle, the sensor being activated when a predetermined level of acceleration acts on the vehicle, to cause the rotation of the lock wheel to be delayed with respect to the rotation of the take-up shaft; lock means for locking the take-up shaft from rotating in a direction in which the webbing is unwound when the rotation of the lock wheel is delayed with respect to the rotation of the take-up shaft; an engagement lever engaged with the lock wheel when the take-up shaft is rotated in the webbing unwinding direction, thereby causing the rotation of the lock wheel to be delayed with respect to the rotation of the take-up shaft, the lever being separated from the lock wheel when the take-up shaft is rotated in the webbing rewinding direction; and control means effecting control so that, when the take-up shaft has been rotated to unwind a predetermined amount of webbing, the engagement lever is allowed to engage with the lock wheel, whereas, when the take-up shaft has been rotated to rewind a predetermined amount of webbing, the lever is separated from the lock wheel and maintained in this state.

By virtue of the above-described arrangement, when the occupant has the webbing fastened after it has been rewound by a predetermined amount, if an emergency situation of the vehicle occurs, the acceleration sensor causes the rotation of the lock wheel to be delayed with respect to the rotation of the take-up shaft so as to lock the take-up shaft from rotating in the webbing unwinding direction. After the webbing has been unwound by a predetermined amount, it can be rewound, but when the webbing is unwound in this state, the engagement lever causes the rotation of the lock wheel to be delayed with respect to the rotation of the take-up shaft, thereby allowing the take-up shaft to rotate in the webbing rewinding direction alone. When the take-up shaft is rotated in the webbing rewinding direction, the engagement lever is separated from the lock wheel, so that the lock wheel rotates without being contacted by the lever, and therefore no chattering noise is generated.

The above and other objects, features and advantages of the present invention will become more apparent from the following description of the preferred embodiments thereof, taken in conjunction with the accompanying drawings.

DESCRIPTION OF THE PREFERRED EMBODIMENTS

The present invention will be described hereinunder in detail with reference to the accompanying drawings.

Figure 1:
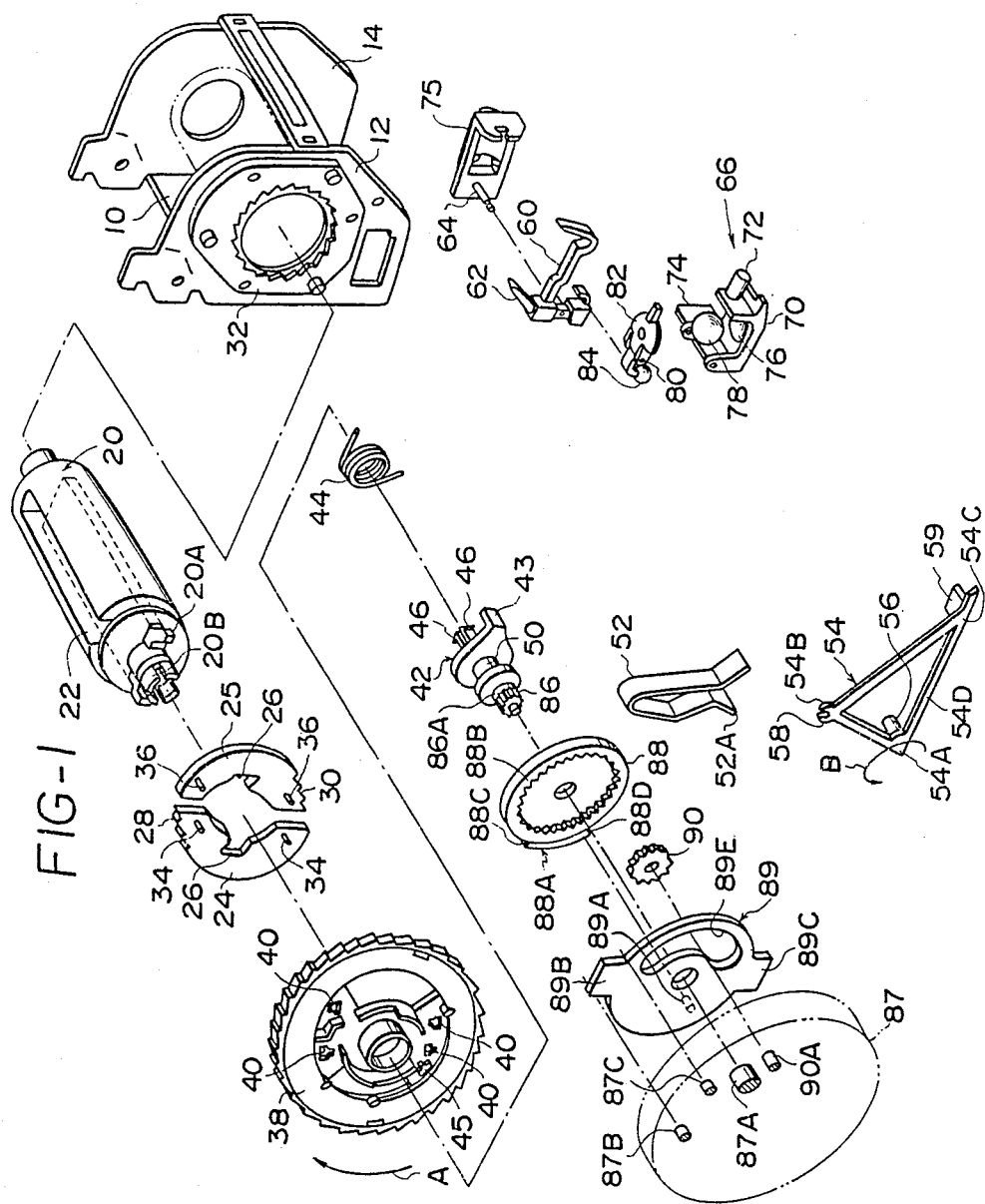
FIG. 1 is an exploded perspective view of a first embodiment of the webbing retractor according to the present invention.

FIG. 1 is an exploded perspective view of a first embodiment of the webbing retractor according to the present invention. In this retractor, a frame 10 is rigidly secured to the body of a vehicle by means of mounting bolts (not shown). A pair of leg plates 12 and 14 extend parallel with each other from two laterial ends, respectively, of the frame 10.

A take-up shaft 20 is rotatably supported by these leg plates 12 and 14. A through-hole 22 is provided in the center of the take-up shaft 20 in such a manner as to extend radially, and one end of an occupant restraining webbing (not shown) is retained by the through-hole 22. This webbing is wound up in layers on the take-up shaft 20 and has a tongue plate supported by the other end thereof. When the occupant engages this tongue plate with a buckle device (not shown) which is secured to the vehicle body, he can wear the intermediate portion of the webbing.

The take-up shaft 20 has a projecting portion 20A which projects from one longitudinal end thereof.

A pair of lock plates 24 and 25 (shown in FIGS. 1 and 3) which define a part of lock means are disposed around the projecting portion 20A.

Each of the lock plates 24 and 25 has a substantially U-shaped notched recess 26 in the center thereof, thus having a substantially C-shaped cross-section as a whole. The projecting portion 20A is received within the recesses 26, thereby allowing the lock plates 24 and 25 to rotate together with the take-up shaft 20.

Figure 3:
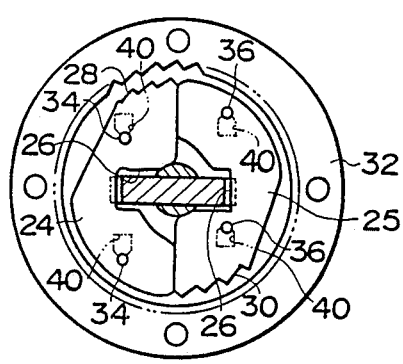
FIG. 3 is a front view showing the relationship between the lock plates and the internally-toothed ratchet wheel shown in FIG. 1.

The width of each recess 26 is made slightly larger than the width of the projecting portion 20A as shown in FIG. 3, thus enabling the lock plates 24 and 25 to rotate relative to the take-up shaft 20 through a predetermined angle.

A pawl portion 28 is formed at one end of the lock plate 24, and a pawl portion 30 at one end of the lock plate 25. These pawl portions 28 and 30 oppose lock teeth of an internally-toothed ratchet wheel 32 which is rigidly secured to the leg plate 12.

A pair of pins 34 project from the lock plate 24, and a pair of pins 36 from the lock plate 25. These pins 34 and 36 are respectively received in slots 40 formed in a lock wheel 38. This lock wheel 38 is rotatably supported on a smaller-diameter shaft portion 20B projecting from the axial center of the take-up shaft 20 in such a manner that the lock wheel 38 is rotatable relative to the take-up shaft 20.

A torsion coil spring 44 is interposed between the lock wheel 38 and a spring retainer pin 43 provided on a rotary wheel 42 which is mounted on the distal end of the smaller-diameter shaft portion 20B.

The torsion coil spring 44 is coaxially supported on the lock wheel 38. One end of the spring 44 abuts against the spring retainer pin 43 of the rotary wheel 42, and the other end of the spring 44 abuts against a spring retainer pin 45 projecting from the lock wheel 38. Thus, the lock wheel 38 is subjected to the biasing force from the torsion coil spring 44 so as to rotate in a direction (the direction of the arrow A shown in FIG. 1) in which the take-up shaft 20 rotates when unwinding the webbing.

Accordingly, the lock wheel 38, which is subjected to the biasing force from the torsion coil spring 44, allows each of the pins 34 and 36 on the lock plates 24 and 25 to be received in one end portion of the corresponding slot 40, thus causing the pawl portions 28 and 30 to be separated from the internally-toothed ratchet wheel 32 as shown in FIG. 3.

Figure 4:
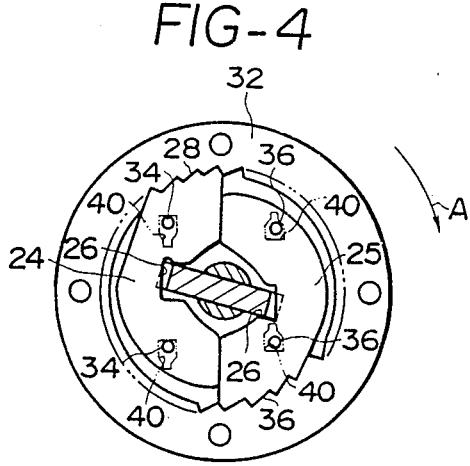
FIG. 4 shows the operation of the lock plates and the internally-toothed ratchet wheel.
Figure 5:
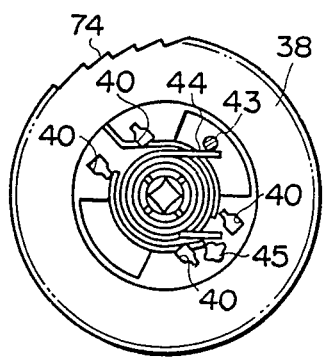
FIG. 5 shows the lock wheel and the torsion coil spring in their assembled state.

However, when relative rotation occurs between the lock wheel 38 and the take-up shaft 20 rotating in a direction in which the webbing is unwound, the rotation of the lock wheel 38 is delayed with respect to the rotation of the take-up shaft 20 against the biasing force from the torsion coil spring 44, and at this time, the lock wheel 38 causes each of the pins 34 and 36 to move within the associated slot 40 in the longitudinal direction thereof, thereby allowing the pawl portions 28 and 30 to engage with the internally-toothed ratchet wheel 32 as shown in FIG. 4.

It should be noted that the rotary wheel 42 is retained by the take-up shaft 20 through a pair of retainer pawls 46 which are received in a rectangular bore 48 provided in the take-up shaft 20, and the rotary wheel 42 is thereby adapted to rotate together with the take-up shaft 20 in one unit.

A leaf spring 52 which defines a friction member is mounted on the outer peripheral surface 50 of the rotary wheel 42. The leaf spring 52 is bent so as to have a substantially V-shaped cross-section. The intermediate portion of the leaf spring 52 is in press contact with the outer peripheral surface 50 to receive the rotational force from the take-up shaft 20 through friction occurring at the area of contact therebetween. One half of the V-shaped leaf spring 52 is bent at its intermediate portion, so that the bent intermediate portion is in contact with the outer peripheral surafce 50 of the rotary wheel 42 at two points.

One end portion 52A of the leaf spring 52 is engaged with an engagement lever 54. The lever 54 has a substantially triangular cross-section, and one vertex 54A of this triangular lever 54 is rotatably supported by the leg plate 12 through a pin 56. Another vertex 54B of the triangular lever 54 defines an arm portion 58 for clamping the end portion 52A of the leaf spring 52.

The remaining vertex 54C of the triangular lever 54 has a pawl 59 which opposes the toothed portion of the lock wheel 38. Thus, when the lever 54 is pivoted in the direction of the arrow B in FIG. 2 about the pin 56, the pawl 59 is engaged with the lock wheel 38, thus causing the rotation of the lock wheel 38 to be delayed with respect to the rotation of the take-up shaft 20.

More specifically, when the take-up shaft 20 is rotated in the direction in which the webbing is unwound (the direction of the arrow A in FIG. 1), the leaf spring 52 is also rotated in the same direction by means of frictional force. In consequence, the end portion 52A presses the arm portion 58 in such a manner that the pawl 59 is engaged with the lock wheel 38 [see FIG. 2(B)].

It should be noted that, when the take-up shaft 20 is rotated in the direction in which the webbing is rewound, the leaf spring 52 presses the arm portion 58 in the reverse direction to the above, thus allowing the lock wheel 38 to rotate without being contacted by the engagement lever 54.

Accordingly, it is possible to prevent the generation of chattering noise which would otherwise occur when the lock wheel 38 rotates while being in contact with the lever 54.

One side portion 54D of the engagement lever 54 opposes an arm 62 of a pawl lever 60 which defines connecting means. The pawl lever 60 is pivotally supported by the leg plate 12 through a pin 64, and pivoted when an acceleration sensor 66 is activated, so that the distal end portion of the pawl lever 60 is meshed with the lock wheel 38 to stop the take-up shaft 20 from rotating in the webbing unwinding direction.

However, when the take-up shaft 20 is rotated in the webbing rewinding direction (counter to the direction of the arrow A), the arm 62 is subjected to the rotational force from the take-up shaft 20 through the leaf spring 52 and the side portion 54D of the engagement lever 54, and the arm 62 is thereby disengaged from the lock wheel 38.

The acceleration sensor 66 is arranged such that a casing 70 is secured to a mounting bracket 75 by means of a pin 72 and a bracket 74, the bracket 75 being secured to the leg plate 12, and a ball 78 is disposed in a conical recess 76 formed in the casing 70 in such a manner that the ball 78 goes up the conical recess 76 when acceleration acts.

An actuator 82 is pivotally supported by the casing 70 through a pin 80 in such a manner that one end portion of the actuator 82 is placed on the ball 78. The arrangement is such that, when said end portion is pushed up by the ball 78, a spherical portion 84 which is provided at the other end of the actuator 82 actuates the pawl lever 60 to pivot about the pin 64, thus causing the distal end portion of the pawl lever 60 to engage with the lock wheel 38.

The axis of the spherical portion 84 of the actuator 82 extends horizontally and passes through the central axis of the pin 72. Accordingly, even when the angle at which the acceleration sensor 66 is secured to the leg plate 12 is changed about the axis of the pin 72, there is no change in the position of contact between the spherical portion 84 and the pawl lever 60, and it is therefore possible to tilt the pawl lever 60 when acceleration acts.

Thus, the webbing retractor according to the present invention has two different types of lock mechanism, that is, the pawl lever 60 which is caused to engage with the lock wheel 38 by the action of the acceleration sensor 66, and the pawl 59 of the engagement lever 54 which is caused to engage with the lock wheel 38 when the take-up shaft 20 is rotated in the webbing unwinding direction (it should be noted that the lock plates 24 and 25 which define lock means are commonly used by both the lock mechanisms).

The following is a description of the structure for effecting switching between the lock mechanism activated by the acceleration sensor 66 [hereinafter referred to as "ELR" (Emergency Locking Retractor)] and the lock mechanism wherein locking is effected by the engagement between the pawl 59 of the engagement lever 54 and the lock wheel 38 which is made when the take-up shaft 20 is rotated in the webbing unwinding direction [hereinafter referred to as "ALR" (automatic locking retractor)].

Figure 2:
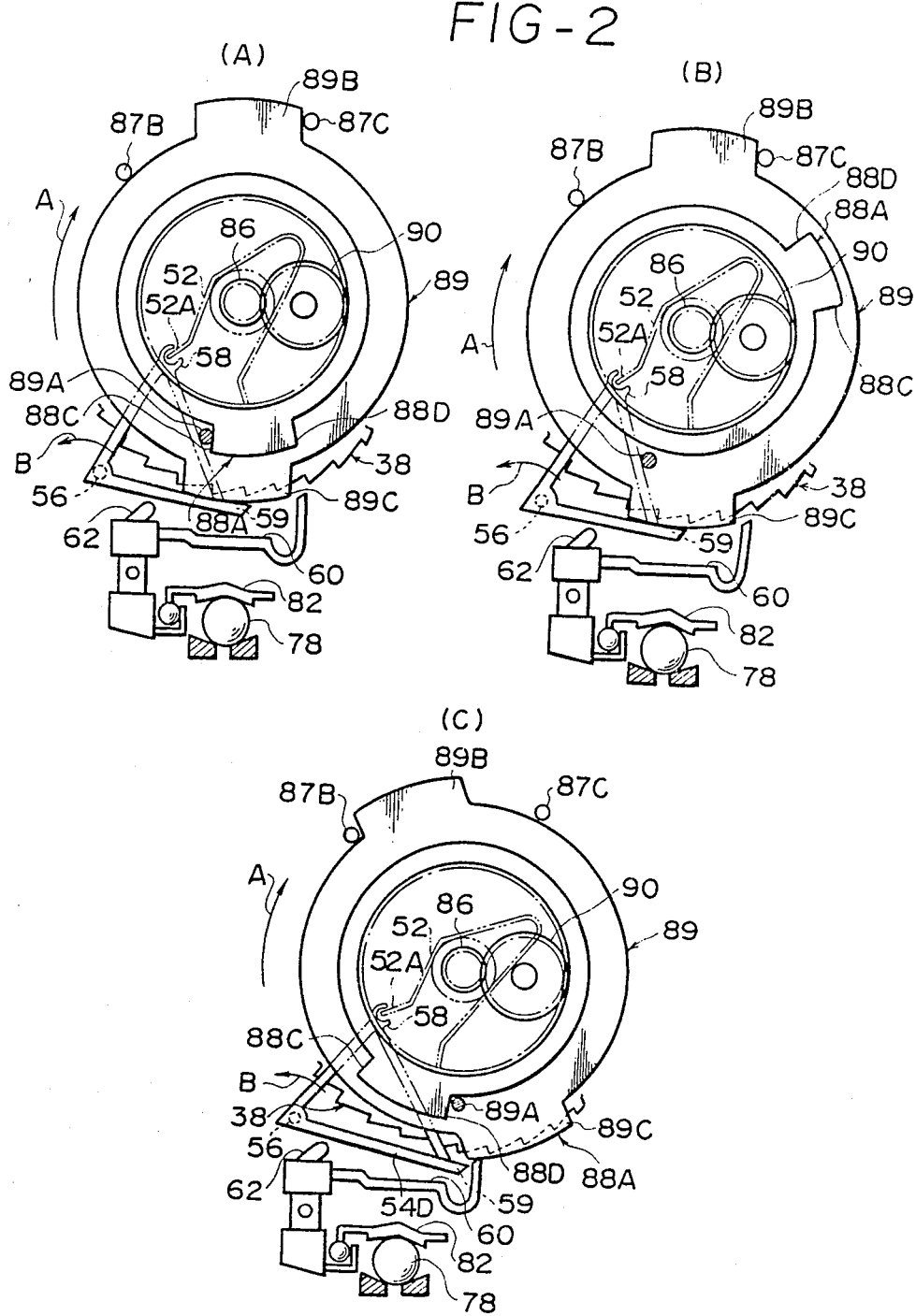
FIGS. 2(A) to 2(C) are front views showing the operation of the ALR mechanism shown in FIG. 1.

Referring to FIGS. 1 and 2, a pinion 86 is formed integral with the rotary wheel 42 in such a manner that the pinion 86 projects from the axial center of the rotary wheel 42. A columnar portion 86A is formed at the proximal portion of the pinion 86, and an actuating plate 88 is rotatably supported on the columnar portion 86A. The actuating plate 88 has a disk-shaped configuration and is provided with a projection 88A which projects radially from a part of its outer periphery. The projection 88A opposes a pin 89A which is secured to a cam plate 89 pivotally supported by a columnar portion 87A which projects from a cover 87 in coaxial relation to the pinion 86. A rib 88B is formed on the actuating plate 88 in such a manner that the rib 88B projects axially from the peripheral portion of the plate 88. An internally toothed gear wheel is formed in the rib 88B and is meshed with the pinion 86 through a gear 90. Thus, the rotation of the take-up shaft 20 is transmitted to the actuating plate 88 after the speed thereof has been reduced. The gear 90 is rotatably supported by a pin 90A which projects from the cover 87.

The actuating plate 88 is adapted to rotate substantially one turn while the fully wound webbing is fully unwound. More specifically, when the take-up shaft 20 is rotated in the webbing rewinding direction, the actuating plate 88 is rotated in the direction of the arrow A in FIG. 2, and one longitudinal end (hereinafter referred to as a "first end") 88C of the projection 88A presses the pin 89A, thus causing the cam plate 89 to turn slightly in the same direction. The cam plate 89 is adapted to be at rest at all times except for the time when it is turned by the actuating plate 88. For this purpose, a frictional contact means may be interposed between the the cam plate 89 and the cover 87. Further, the cam plate 89 is provided with a bore 89E for passing the pin 90A which rotatably supports the gear 90.

When the take-up shaft 20 is rotated in the webbing unwinding direction, the actuating plate 88 is rotated one turn counter to the direction of the arrow A in FIG. 2, and the other end 88D (hereinafter referred to as a "second end") of the projection 88A presses the pin 89A.

It should be noted that two projections 89B and 89C are formed integral with the outer periphery of the cam plate 89, the projections 89B and 89C extending in the diametrical direction of the cam plate 89. The projection 89B defines a stopper which limits the range within which the cam plate 89 can turn, and is disposed in such a manner that the projection 89B is movable between two pins 87B and 87C which are secured to the cover 87. The projection 89C opposes the engagement lever 54, and when the cam plate 89 is turned in the direction of the arrow A in FIG. 2 immediately before the webbing has been fully rewound on the take-up shaft 20, the projection 89C comes into contact with the pawl 59 of the engagement lever 54 and pushes down the lever 54.

Thus, the engagement lever 54 is pivoted counter to the direction of the arrow B in FIG. 2 about the pin 56, thereby allowing the lever 54 to separate from the lock wheel 38 (i.e., cancellation of the ALR mechanism).

On the other hand, immediately before the webbing has been fully unwound from the take-up shaft 20, the projection 89C is turned by the actuating plate 88 in the direction in which it separates from the engagement lever 54, thereby allowing the lever 54 to engage with the lock wheel 38 (resumption of the ALR mechanism).

In the webbing retractor according to this embodiment, the ALR mechanism has priority over the ELR mechanism. More specifically, the ELR mechanism is activated, that is, the action of the acceleration sensor 66 is transmitted to the lock wheel 38, only when the ALR mechanism is canceled.

The following is a description of the operation of this embodiment.

Before the occupant of the vehicle fastens the seatbelt, the webbing is in a full-wound state on the take-up shaft 20.

Accordingly, the engagement lever 54, which is pushed down by the projection 89C of the cam plate 89, is constantly separated from the lock wheel 38. Therefore, in this state, the take-up shaft 20 is under the control of the ELR mechanism. More specifically, the first end 88C of the projection 88A turns the cam plate 89 in the direction of the arrow A through the pin 89A until the cam plate 89 reaches the position shown in FIG. 2(A), and the projection 89C presses the pawl 59 of the engagement lever 54 so that the pawl 59 is separated from the lock wheel 38. In this state, the pawl lever 60 of the acceleration sensor 66 is allowed to move upward until the arm 62 comes into contact with the engagement lever 54. However, since no acceleration acts on the vehicle, the lever 60 is at the lowered position, and the distal end portion of the lever 60 is therefore separated from the lock wheel 38.

When the occupant unwinds the webbing from the take-up shaft 20 in order to fasten it, the rotation of the take-up shaft 20 in the webbing unwinding direction is transmitted to the actuating plate 88 after the speed thereof has been reduced, and the actuating plate 88 is thereby gradually rotated counterclockwise as viewed in FIG. 2(A). Since the cam plate 89 is at rest, the projection 88A is gradually separated from the pin 89A, and the cam plate 89 maintains the engagement lever 54 in the push-down state.

When the vehicle is in a normal state after the occupant has fastened the webbing, the ball 78 remains on the bottom of the conical recess 76. In consequence, the pawl lever 60 is separated from the lock wheel 38 irrespective of the pivotal movement of the leaf spring 52. For this reason, it is possible for the occupant who has the webbing fastened to freely wind the webbing in and out on the take-up shaft 20 so as to assume a desired driving posture.

When the vehicle runs into an emergency situation such as a collision, the ball 78 pushes up the actuator 82 about the pin 80, so that the pawl lever 60 is pivoted through the spherical portion 84. Consequently, the distal end portion of the pawl lever 60 is engaged with the lock wheel 38. Since the engagement lever 54 is separated from the arm 62 of the pawl lever 60, there is no fear of the lever 54 interfering with the pivotal movement of the pawl lever 60.

On the other hand, the occupant is moved in the direction in which acceleration acts, and the webbing is therefore unwound from the take-up shaft 20, causing the take-up shaft 20 to rotate in the clockwise direction as viewed in FIG. 1. In consequence, the lock wheel 38 which rotates together with the take-up shaft 20 is prevented from rotating by means of the pawl lever 60, and this causes relative rotation between the lock wheel 38 and the take-up shaft 20.

This relative rotation causes the torsion coil spring 44 to be deformed, and the pins 34 and 36 of the lock plates 24 and 25 which rotate together with the take-up shaft 20 are guided by the respective slots 40 formed in the lock wheel 38 in such a manner that the pawl portions 28 and 30 are engaged with the internally-toothed ratchet wheel 32 as shown in FIG. 4, whereby the take-up shaft 20 is locked from rotating in the direction in which the webbing is unwound. As a result, the occupant is brought into a reliable webbing restrained condition.

When the vehicle is running on a rough road with many irregularities, the ball 78 is held in a state wherein it continuously pushes up both the actuator 82 and the pawl lever 60. At the same time, the occupant is bumped up and down by the vibration of the vehicle body, and the webbing is therefore repeatedly wound in and out on the take-up shaft 20.

On such an occasion, in the conventional webbing retractor, every time the webbing is wound up, the lock wheel 38 rotates counterclockwise from the position shown in FIG. 2 by an amount corresponding to one or more ratchet teeth formed on the lock wheel 38 and then reengages with the pawl lever 60 held in the raised position, which fact disadvantageously causes the webbing to be gradually wound up on the take-up shaft 20.

In this embodiment, however, the above-described problem is solved by the provision of the leaf spring 52. More specifically, when the leaf spring 52 is pivoted by the force derived from the rotation of the take-up shaft 20 in the direction in which the webbing is wound up, the leaf spring 52 actuates the arm 62 to pivot clockwise through the side portion 54D of the engagement lever 54, thus causing the pawl lever 60 to be pushed down so as to separate from the lock wheel 38. In consequence, the lock wheel 38 is instantaneously rotated in the clockwise direction by means of the force released from the compressed torsion coil spring 44.

Even if, thereafter, the take-up shaft 20 is further rotated in the webbing unwinding direction as the result of the vibration of the vehicle, the lock wheel 38 is maintained in the previous locked state or locked in the state wherein it has further rotated in the webbing unwinding direction from the position in the previous locked state by an amount which corresponds to one or more ratchet teeth. There is therefore no risk of the webbing being gradually wound up onto the take-up shaft 20.

Thus, this embodiment involves no fear of the webbing being gradually wound up onto the take-up shaft 20 even when the vehicle is running on a rough road. It is therefore possible for the occupant to maintain driving comfort.

In the webbing retractor in accordance with this embodiment, the ELR mechanism can be switched over to the ALR mechanism according to need.

Switching over from the ELR mechanism to the ALR mechanism can be done by fully unwinding the webbing from the take-up shaft 20.

When the take-up shaft 20 is rotated in the webbing unwinding direction, the actuating plate 88 is rotated counter to the direction of the arrow A in FIG. 2. The rotation of the take-up shaft 20 is transmitted to the actuating plate 88 after the speed thereof has been reduced by the gear train consisting of the pinion 86 and the gear 90, so that the actuating plate 88 rotates substantially one turn while the fully wound webbing is fully unwound.

As shown in FIG. 2(A), the second end 88D of the projection 88A comes into contact with the pin 89A of the cam plate 89 immediately before the webbing has fully been unwound. Accordingly, when the webbing is fully unwound, the projection 88A presses the pin 89A and turns the cam plate 89 counter to the direction of the arrow A as shown in FIG. 2(C). As the cam plate 89 turns, the projection 89C which has pushed down the engagement lever 54 separates from the lever 54, thus enabling the lever 54 to engage with the lock wheel 38. At this time, since the take-up shaft 20 is rotated in the webbing unwinding direction, the rotational force therefrom is transmitted to the engagement lever 54 through the leaf spring 52. Accordingly, the lever 54 is pivoted in the direction of the arrow B in FIG. 2 about the pin 56.

Thus, in this webbing retractor, the engagement lever 54 is meshed with the lock wheel 38 at all times when the take-up shaft 20 is rotated in the direction in which the webbing is unwound. Therefore, the rotation of the take-up shaft 20 in the webbing unwinding direction can be locked by activating the lock means in a manner similar to that in the case of the above-described ELR mechanism.

When the take-up shaft 20 is rotated in the direction in which the webbing is rewound, the rotational force from the take-up shaft 20 is transmitted to the engagement lever 54 through the leaf spring 52 in such a manner that the lever 54 is biased to pivot counter to the direction of the arrow B in FIG. 2 about the pin 56. Accordingly, the lever 54 is separated from the lock wheel 38, and it is therefore possible to prevent the generation of chattering noise which would otherwise occur when the lock wheel 38 rotates while being in contact with the lever 54 as in the case of the conventional webbing retractor.

In this case, at the same time as the rotation of the take-up shaft 20 in the webbing rewinding direction changes to the rotation in the webbing unwinding direction, the leaf spring 52 allows the engagement lever 54 to engage with the lock wheel 38. Therefore, there is no fear of the function of the ALR mechanism being impaired, and the take-up shaft 20 is reliably locked from rotating in the webbing unwinding direction.

To change the ALR mode for the ELR mode, the webbing is unfastened from the occupant's body, and the take-up shaft 20 is rotated until the webbing is nearly fully rewound. Consequently, the projection 89C pushes down the engagement lever 54 so that the lever 54 is disengaged from the lock wheel 38 as shown in FIG. 2(A), thus bringing the webbing retractor under the control of the ELR mechanism again.

It should be noted that the pivotal movement of the engagement lever 54 is limited within a predetermined angle, and when the lever 54 pivots through the predetermined angle, relative rotation occurs between the leaf spring 52 and the rotary wheel 42.

Although in this embodiment the rotation of the take-up shaft 20 is transmitted to the engagement lever 54 through the leaf spring 52 which defines a friction member, a tension coil spring or the like may be employed in place of the leaf spring 52.

Figure 6:
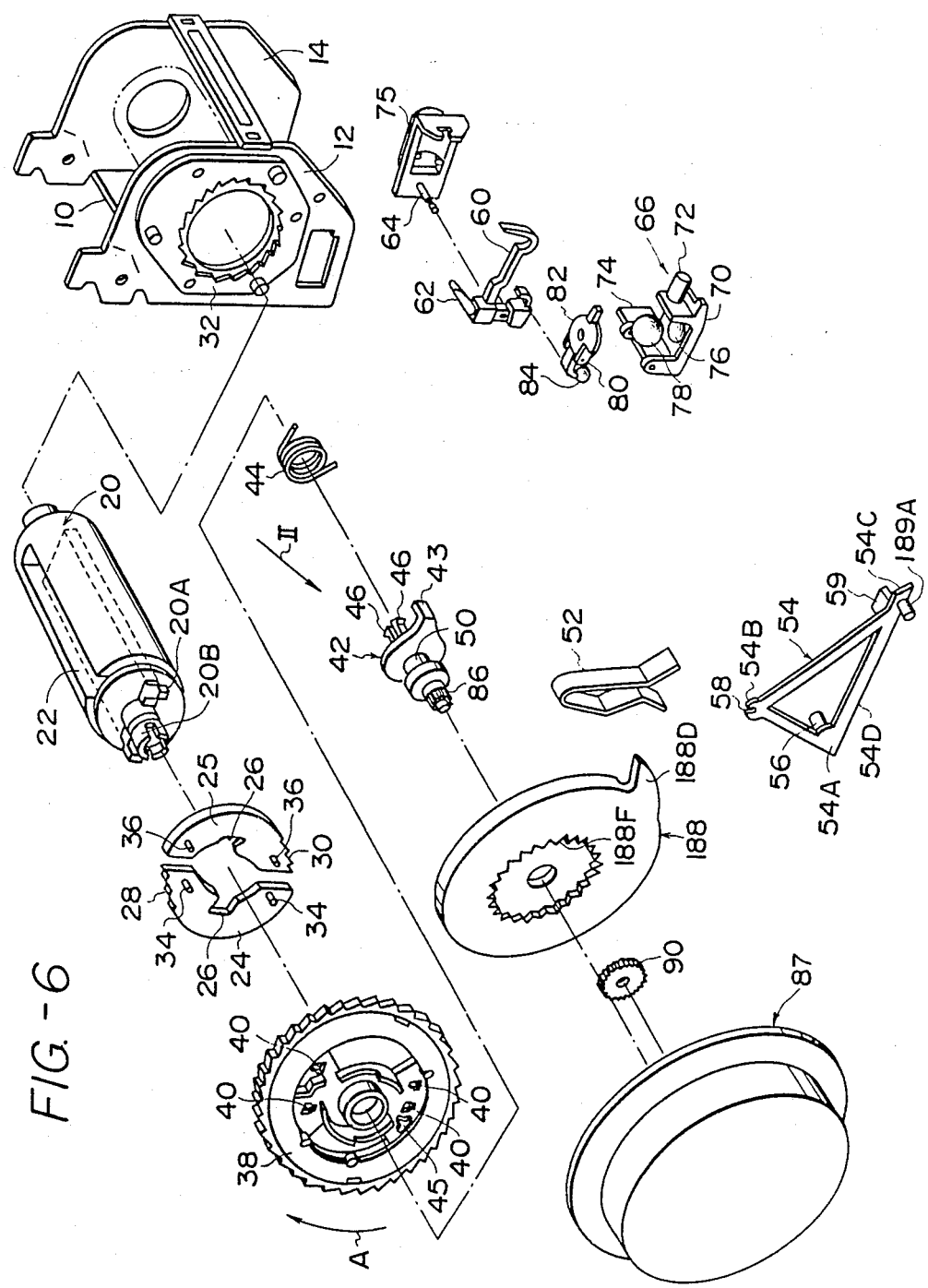
FIG. 6 is an exploded perspective view of a second embodiment of the webbing retractor according to the present invention.

A second embodiment of the present invention will be explained below with reference to FIGS. 6 to 8. In this embodiment, an actuating plate 188 is employed in place of the combination of the actuating plate 88 and the cam plate 89. The actuating plate 188 is rotatably supported by the rotary wheel 42.

The actuating plate 188 has a disk-shaped configuration. A circular groove 188A which defines a part of guide means is provided in one end face of the actuating plate 188 on the side thereof which is closer to the rotary wheel 42, the groove 188A opposing a pin 189A which is secured to the vertex 54C of the engagement lever 54. An internally-toothed gear 188F is provided in the other end face of the actuating plate 188, and meshed with the pinion 86 through the gear 90 which is rotatably supported by the cover 87. Thus, the rotation of the take-up shaft 20 is transmitted to the actuating plate 188 after the speed thereof has been reduced.

The arrangement is such that the actuating plate 188 rotates substantially one turn while the fully wound webbing is fully unwound. More specifically, when the take-up shaft 20 is rotated in the direction in which the webbing is rewound, the actuating plate 188 is rotated in the direction of the arrow A in FIG. 8 while guiding the pin 189A along the groove 188A. When, after the pin 189A has reached one end (hereinafter referred to as a "first end") 188B of the groove 188A, the take-up shaft 20 is further rotated and the webbing is thereby nearly fully rewound, the pin 189A is pushed out of the groove 188A to reach a position on the outer periphery of the actuating plate 188 as shown by the imaginary line in FIG. 8(C) (cancellation of the ALR mechanism). Dimensions are so set that, when the pin 189A is in the above-described state, the pawl 59 of the lever 54 is separated from the lock wheel 38. In order to push out the pin 189A from the groove 188A and prevent the pin 189A from undesirably returning to the groove 188A, it is preferable to employ a resiliently flexible material for a portion 188G which defines a part of the actuating plate 188 and also the outlet of the groove 188A. Employment of such flexible material enables the outlet of the groove 188A to be resiliently closed.

When the take-up shaft 20 is rotated in the direction in which the webbing is unwound in a state wherein the pin 189A is in contact with the outer periphery of the actuating plate 188, the pin 189A moves along the outer periphery of the plate 188 and re-enters the groove 188A by being guided by a a guide projection 188D which projects radially from the other end (hereinafter referred to as a "second end") 188C of the groove 188A, as shown in FIG. 8(A) (resumption of the ALR mechanism).

The size of the pin 189A is so set that the pin 189A is slightly movable in the groove 188A in the radial direction of the actuating plate 188, whereby, when the take-up shaft 20 is rotated in the webbing unwinding direction, the pin 189A is turned counterclockwise (the direction of the arrow B) as viewed in FIG. 8(B) by means of the biasing force from the leaf spring 52 so as to come into contact with the inner side wall of the groove 88A (i.e., the side wall of the groove 88A which is closer to the longitudinal axis of the take-up shaft 20). In this state, the pawl 59 of the engagement lever 54 is engaged with the lock wheel 38 to lock the take-up shaft 20 from rotating in the webbing unwinding direction.

On the other hand, when the take-up shaft 20 is rotated in the webbing rewinding direction, the pin 189A is brought into contact with the outer side wall of the groove 188A by means of the biasing force from the leaf spring 52 [see the position shown by the solid line in FIG. 6(B)], so that the lock wheel 38 rotates without being contacted by the pawl 59.

The following is a description of the operation of this embodiment.

Before the occupant of the vehicle fastens the seatbelt, the webbing is in a full-wound state on the take-up shaft 20 of the webbing retractor.

Accordingly, the pin 189A has already come out of the groove 188A and is disposed on the outer periphery of the actuating plate 188, thereby maintaining the engagement lever 54 to be constantly separate from the lock wheel 38, and thus allowing the pawl lever 60 of the acceleration sensor 66 to move upward until it comes into contact with the engagement lever 54. In other words, the take-up shaft 20 is under the control of the ELR mechanism.

Therefore, the occupant can fasten the webbing in a manner similar to that in the above-described first embodiment. When the vehicle runs into an emergency situation, the acceleration sensor 66 acts so as to stop the take-up shaft 20 from rotating in the direction in which the webbing is unwound. When the vehicle is running on a rough road, the engagement lever 54 pushes down the pawl lever 66 when the take-up shaft 20 is rotated in the direction in which the webbing is rewound. Therefore, there is no fear of the webbing being gradually wound up onto the take-up shaft 20.

When the lock mechanism needs to be changed over to the ALR mechanism, the webbing is fully unwound from the take-up shaft 20 in a way similar to that in the first embodiment.

Figure 8:
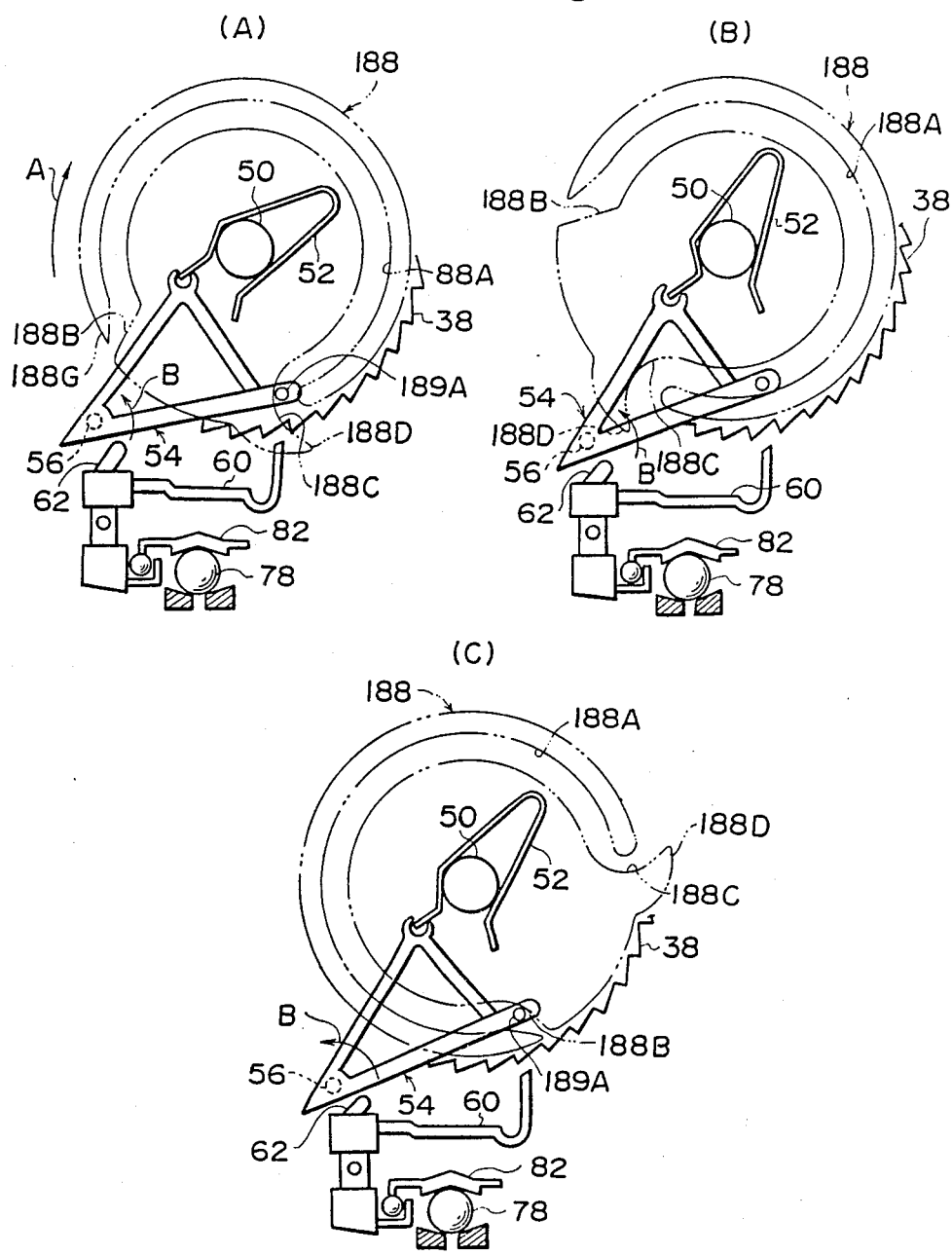
FIG. 8(A) to 8(C) show the operation of the second embodiment.

When the take-up shaft 20 is rotated in the webbing unwinding direction, the actuating plate 188 is rotated counter to the direction of the arrow A in FIG. 8. The rotation of the take-up shaft 20 is transmitted to the actuating plate 188 after the speed thereof has been reduced by the gear train consisting of the pinion 86 and the gear 90, so that the actuating plate 188 rotates substantially one turn while the fully wound webbing is fully unwound.

The pin 189A is disposed on the outer periphery of the actuating plate 188 and at the second end 188C of the groove 188A immediately before the webbing has fully been unwound. Accordingly, when the webbing is further unwound to reach a full-unwound state, the pin 189A re-enters the groove 188A by being guided inward by the guide projection 189D provided at the second end 188C of the groove 188A, thus bringing the ALR mechanism into an operative state [see FIG. 8(A)].

Figure 7:
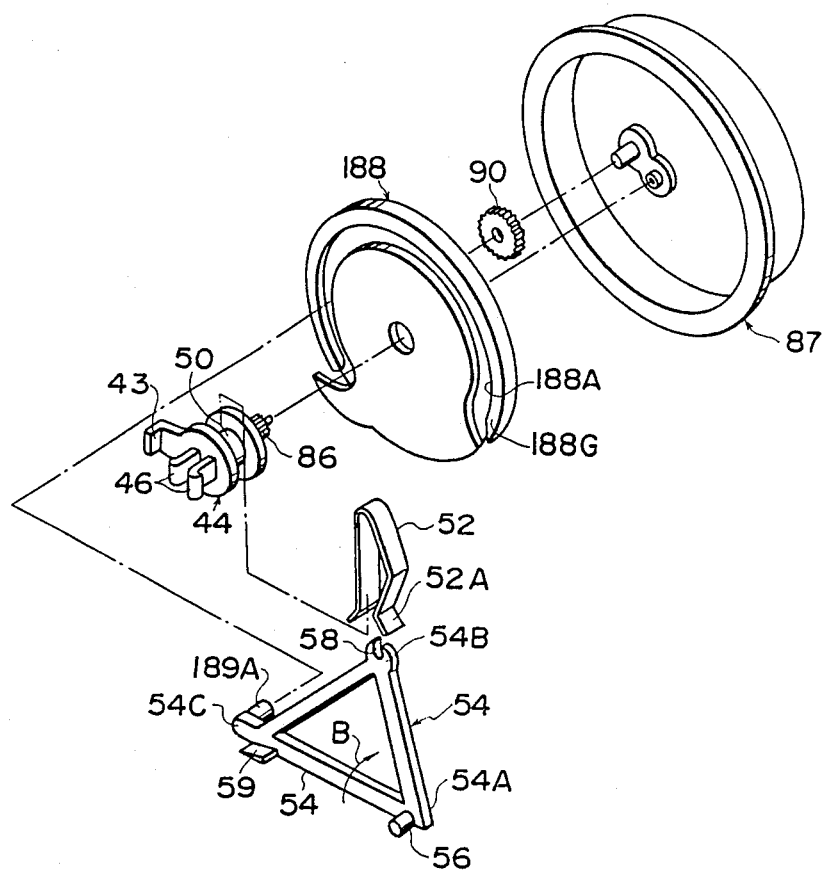
FIG. 7 is an exploded perspective view of a part of the webbing retractor shown in FIG. 6, as viewed from the reverse side thereof.

During this operation, since the take-up shaft 20 is rotated in the webbing unwinding direction, the rotational force from the take-up shaft 20 is transmitted to the engagement lever 54 through the leaf spring 52 to bias the lever 54 so as to pivot in the direction of the arrow B in FIG. 7 about the pin 56, thus allowing the pin 189A to readily enter the groove 188A.

When, in this state, the take-up shaft 20 is rotated in the webbing rewinding direction, the occupant is brought into a webbing fastened condition. Since, at this time, the pin 189A is moved while being in contact with the outer side wall of the groove 188A by means of the rotational force transmitted from the leaf spring 52 [see FIG. 8(B)], the lock wheel 38 and the engagement lever 54 are separated from each other. Therefore, no chattering noise is generated which would otherwise be produced when the lock wheel 38 rotates while being in contact with the engagement lever 54.

On the other hand, when the take-up shaft 20 is rotated in the webbing unwinding direction, the pin 189A is brought into contact with the inner side wall of the groove 188A by means of the rotational force from the leaf spring 52 [see the position shown by the imaginary line in FIG. 6(B)]. Accordingly, the engagement lever 54 is constantly meshed with the lock wheel 38, thus enabling the lock means to be activated in a manner similar to that in the case of the ELR mechanism to lock the take-up shaft 20 from rotating in the webbing unwinding direction.

More specifically, at the same time as the rotation of the take-up shaft 20 in the webbing rewinding direction is changed to the rotation in the webbing unwinding direction, the engagement lever 54 is allowed to engage with the lock wheel 38 by the action of the leaf spring 52. There is therefore no fear of the function of the ALR mechanism being impaired.

To return the lock mechanism into the ELR mode, the webbing is fully rewound on the take-up shaft 20 to push out the pin 189A from the first end 188B of the groove 188A [see FIG. 6(C)] in order to prevent the engagement lever 54 from engaging with the lock wheel 38 at all times, whereby, when the acceleration which acts on the vehicle exceeds a predetermined level, the pawl lever 60 is engaged with the lock wheel 38 to activate the lock means.

Although the present invention has been described through specific terms, it should be noted here that the described embodiments are not necessarily exclusive and various changes and modifications may be imparted thereto without departing from the scope of the invention which is limited solely by the appended claims.

What is claimed is:

1. A webbing retractor for use in a seatbelt system for a vehicle designed to protect an occupant when an emergency situation of the vehicle occurs, said webbing retractor being able to be selectively set in two states, that is, one wherein an occupant restraining webbing is stopped from being unwound in accordance with the level of acceleration which acts on the vehicle, and the other wherein said webbing is allowed to be rewound only, comprising:

(a) a webbing take-up shaft rotatably mounted on a frame;

(b) a lock wheel rotatably disposed on said take-up shaft and urged by a torsion coil spring, and being rotated in unison with rotation of said take-up shaft in a direction in which said webbing is unwound;

(c) an acceleration sensor disposed on said frame and including all means, actuator means and pawl lever means for sensing an acceleration acting on said vehicle, said sensor being activated when a predetermined level of acceleration acts on the vehicle;

(d) lock means disposed operable between said take-up shaft and said lock wheel for locking said take-up shaft from rotating in a direction in which said webbing is unwound when the rotation of said lock wheel is delayed by the resilient force of said torsion coil spring with respect to the rotation of said take-up shaft;

(e) a rotary wheel including a pinion, said wheel being directly connected to said take-up shaft to rotate together with said shaft, and a resilient member resiliently mounted on said rotary wheel;

(f) an engagement lever pivotally mounted on said frame and connected to said resilient member and disposed to releasably engage with said lock wheel when said take-up shaft is rotated in the webbing unwinding direction, thereby causing the rotation of said lock wheel to be delayed by said torsion coil spring with respect to the rotation of said take-up shaft, said lever being separated from said lock wheel when said take-up shaft is rotated in the webbing rewinding direction; and (g) control means for allowing said engagement lever to engage with said lock wheel when said take-up shaft has been rotated to unwind a predetermined amount of webbing, whereas, when said take-up shaft has been rotated to rewind a predetermined amount of webbing, said lever is separated from said lock wheel and maintained in this state, whereby, when the occupant has said webbing fastened after it has been rewound by a predetermined amount, if an emergency situation of the vehicle occurs, said acceleration sensor causes the rotation of said lock wheel to be delayed with respect to the rotation of said take-up shaft so as to lock said take-up shaft from rotating in the webbing unwinding direction; and after said webbing has been unwound by a predetermined amount, it can be rewound, but when said webbing is unwound in this state, said engagement lever causes the rotation of said lock wheel to be delayed with respect to the rotation of said take-up shaft, thereby allowing said take-up shaft to rotate in the webbing rewinding direction alone; and when said take-up shaft is rotated in the webbing rewinding direction, said engagement lever is immediately separated from said lock wheel, so that said lock wheel rotates without being contacted by said lever, thereby completely preventing the generation of a chattering noise.

2. A webbing retractor according to claim 1, wherein said engagement lever receives the rotational force from said take-up shaft through friction.

3. A webbing retractor according to claim 2, wherein said resilient member is comprised by a leaf spring which clamps a part of said rotary wheel which is directly connected to said take-up shaft.

4. A webbing retractor according to claim 1, wherein said engagement lever is disposed in opposing relation to said acceleration sensor, to cause said lever to cancel the operation of said acceleration sensor when said webbing is rewound thereby eliminating the undesirable winding up of said webbing when the vehicle is running of a rough road.

5. A webbing retractor according to claim 1, wherein said control means further includes a cam which is separated from said engagement lever by said resilient member frictionally moved by rotation of said rotary wheel when said take-up shaft is rotated to unwind a predetermined amount of webbing and which is engaged with said lever so as to force said lever to separate from said lock wheel when said take-up shaft is rotated to rewind a predetermined amount of webbing.

6. A webbing retractor according to claim 5, wherein said cam is driven by an actuating plate to which the rotation of said take-up shaft is transmitted after the speed thereof has been reduced by a gear means.

7. A webbing retractor according to claim 1, wherein said control means further includes an actuating member which reciprocatingly guides said engagement lever when said take-up shaft is rotated to unwind a predetermined amount of webbing and when said take-up shaft is rotated to rewind a predetermined amount.

8. A webbing retractor according to claim 7, wherein said actuating member has a disk-shaped configuration, and said outer periphery of said actuating member forms an outer locus, and wherein a circular groove which is communicated with said outer periphery at two positions forms an inner locus.

9. A webbing retractor according to claim 8, wherein the width of said circular groove is so set that said groove controls said engagement lever with margin which allows said lever to come in and out of contact with lock wheel.

10. A webbing retractor according to claim 1, wherein said control means includes an actuating plate with gear means and a cam plate coaxially disposed on said rotary wheel.

11. A webbing retractor for use in a seatbelt system for a vehicle designed to protect an occupant when an emergency situation of the vehicle occurs, comprising:

(a) a webbing take-up shaft rotatably mounted on a frame;

(b) a lock wheel rotatably supported on said take-up shaft;

(c) a coil spring member coaxially disposed to said lock wheel for allowing said lock wheel to rotate in unison with the rotation of said take-up shaft;

(d) an acceleration sensor disposed on said frame and including ball means, actuator means and pawl lever means for sensing an acceleration acting on the vehicle, said pawl lever means engaging with said lock wheel when a predetermined level of acceleration acts on the vehicle, thus causing the rotation on said lock wheel to be delayed with respect to the rotation of said take-up shaft;

(e) an engagement lever pivotally mounted on said frame for releasably engaging said lock wheel, so that said lever, when engaged with said lock wheel, causes the rotation of said lock wheel to be delayed with respect to the rotation of said take-up shaft;

(f) friction drive means including a rotary wheel with a pinion directly connected to said take-up shaft to rotate together therewith, and a resilient member frictionally mounted on said rotary wheel and operably connected to said engagement lever for immediately transmitting the driving force from said take-up shaft to said engagement lever through friction so that, when said webbing is unwound, said lever is engaged with said lock wheel, whereas, when said webbing is rewound, said lever is immediately separated from said lock wheel; and (g) control means including internal gear means, a small diameter gear engaged with said pinion of the rotary wheel and a cam plate rotatably disposed on said rotary wheel to be driven when said webbing is unwound by a predetermined amount so that a smaller-diameter portion of said cam plate opposes said engagement lever to allow said lever to engage with said lock wheel, whereas, when said webbing is rewound by a predetermined amount, said cam plate is driven in the reverse direction so that a larger-diameter portion of said cam plate opposes said engagement lever to maintain said lever to be separated from said lock wheel, whereby, when the occupant has said webbing fastened after it has been rewound by a predetermined amount, if an emergency situation of the vehicle occurs, said acceleration sensor causes the rotation of said lock wheel to be delayed with respect to the rotation of said take-up shaft so as to lock said take-up shaft from rotating in the webbing unwinding direction; after said webbing has been unwound by a predetermined amount, it can be rewound, but when said webbing is unwound in this state, said engagement lever causes the rotation of said lock wheel to be delayed with respect to the rotation of said take-up shaft, thereby allowing said take-up shaft to rotate in the webbing rewinding direction alone; and when said take-up shaft is rotated in the webbing rewinding direction, said engagement lever is immediately separated from said lock wheel, so that said lock wheel rotates without being contacted by said lever, and prevents the generation of a chattering noise.

12. A webbing retractor according to claim 11, wherein said resilient member of said friction drive means clamps the outer periphery of said take-up shaft, and a part of said resilient member is operatively connected to said engagement lever.

13. A webbing retractor according to claim 12, wherein the rotation of said take-up shaft is transmitted to said cam plate after the speed thereof has been reduced by said gear means.

14. A webbing retractor according to claim 13, wherein said control means includes an actuating member to which the rotation of said take-up shaft is transmitted after the speed thereof has been reduced, said cam plate is driven by said actuating member when rotated a predetermined amount.

15. A webbing retractor according to claim 11, wherein said acceleration sensor has a pawl lever which is activated by means of a weight so as to mesh with said lock wheel, said pawl lever being disposed in opposing relation to said engagement lever so that said pawl lever is forced to separate from said lock wheel by the action of said engagement lever when said webbing is rewound.

16. A webbing retractor for winding up by means of a biasing force a webbing of a seatbelt system provided on a vehicle, comprising:
 (a) a webbing take-up shaft rotatably mounted on a frame;
 (b) a lock wheel rotatably supported on said take-up shaft;
 (c) a coil spring member coaxially disposed to said lock wheel for allowing said lock wheel to rotate in unison with the rotation of said take-up shaft;
 (d) an acceleration sensor disposed on said frame and including ball means, actuator means and pawl lever means for sensing an acceleration acting on the vehicle, said pawl lever means engaging with said lock wheel when a predetermined level of acceleration act as on the vehicle, thus causing the rotation of said lock wheel to be delayed with respect to the rotation of said take-up shaft;
 (e) an engagement lever pivotally mounted on said frame for releasably engaging with said lock wheel, so that said lever, when engaged with said lock wheel, causes the rotation of said lock wheel to be delayed with respect to the rotation of said take-up shaft;
 (f) friction drive means including a rotary wheel with a pinion operatively connected to said take-up shaft to rotate immediately together therewith, and a resilient member connected to said engagement lever for immediately transmitting the driving force from said take-up shaft to said engagement lever through friction so that, when said webbing is unwound, said lever is engaged with said lock wheel, whereas, when said webbing is rewound, said lever is separted from said lock wheel; and
 (g) control means including internal gear means, having a small diameter gear engaged with said pinion of the rotary wheel, and movably disposed on said rotary wheel for receiving rotative force with reduced speed from said take-up shaft when said webbing is unwound from said take-up shaft by a predetermined amount, a smaller-diameter portion of said actuating member opposes said engagement lever to allow said lever to engage with said lock wheel, whereas, when said webbing is rewound by a predetermined amount, a larger-diameter portion of said actuating member opposes said engagement lever to maintain said lever to be separated from said lock wheel, whereby, when the occupant has said webbing fastened after it has been rewound by a predetermined amount, if an emergency situation of the vehicle occurs, said acceleration sensor causes the rotation of said lock wheel to be delayed with respect to the rotation of said take-up shaft so as to lock said take-up shaft from rotating in the webbing unwinding direction; after said webbing has been unwound by a predetermined amount, it can be rewound, but when said webbing is unwound in this state, said engagement lever cause the rotation of said lock wheel to be delayed with respect to the rotation of said take-up shaft, thereby allowing said take-up shaft to rotate in the webbing rewinding direction alone; and when said take-up shaft is rotated in the webbing rewinding direction, said engagement lever is immediately separated from said lock wheel, so that said lock wheel rotates without being contacted by said lever, thereby preventing the generation of a chattering noise.

17. A webbing retractor according to claim 16, wherein said resilient member of said friction drive means clamps the outer periphery of said take-up shaft, and a part of said resilient member is operatively connected to said engagement lever.

18. A webbing retractor according to claim 16, wherein said control means includes an actuating member provided with said internal gear means to reduce transmission of the rotation of said take-up shaft.

19. A webbing retractor according to claim 16, wherein said acceleration sensor has a pawl lever which is activated by means of a weight so as to mesh with said lock wheel, wherein said pawl lever is disposed in opposing relation to said engagement lever so that said pawl lever is forced to separate from said lock wheel by the action of said engagement lever when said webbing is rewound.

20. A webbing retractor according to claim 16, wherein said actuating member is arranged such that, when said take-up shaft is rotated to unwind said webbing by a predetermined amount, said actuating member causes a part of said engagement lever to move from the outer periphery thereof so as to be received in an inner groove formed therein, thereby allowing said engagement lever to engage with said lock wheel when said take-up shaft is rotated in the webbing rewinding direction, whereas, when said take-up shaft is rotated to rewind said webbing by a predetermined amount, said actuating member guides said part of said engagement lever from said inner groove to said outer periphery, thereby forcing said engagement lever to separate from said lock wheel.

21. A webbing retractor for use in a seatbelt system for a vehicle designed to protect an occupant in an emergency vehicular situation, comprising:
  (a) a webbing take-up shaft rotatably mounted on a frame;
  (b) a lock wheel operatively connected to said shaft and rotatable therewith;
  (c) an acceleration sensor including a pawl lever means for engaging said pawl lever onto said lock wheel upon the occurance of a preselected amount of acceleration, thereby delaying the rotation of the lock wheel relative to the take-up shaft;
  (d) lock means for preventing the take-up shaft from rotating in a webbing unwinding direction when the rotation of the lock wheel is delayed relative to the take-up shaft;
  (e) an engagement lever pivotally connected to said frame for releasably engaging said lock wheel when said take-up shaft is rotated in a webbing unwinding direction, thereby delaying the rotation of the lock wheel with respect to the take-up shaft, said lever being separated from said lock wheel when said shaft is rotated in a webbing rewinding direction;
  (f) an actuating member connected to said engagement lever and to said shaft and adapted to rotate with said shaft without delay for immediately separating said engaement lever from said lock wheel when said shaft is rotated in a webbing rewinding direction to prevent the generation of a chattering noise between said lever and said lock wheel, wherein said engagement lever releasably engages the pawl lever of said acceleration sensor whenever said actuating member separates said engagement lever from said lock wheel to prevent said sensor from incrementally rewinding the webbing in response to spurious actuations of said sensor by vibrations caused by rough driving conditions.

* * * * *